United States Patent [19]

Schulz

[11] 4,212,680
[45] Jul. 15, 1980

[54] THIXOTROPIC REFRACTORY BINDER BASED UPON ALUMINUM PHOSPHATE GELLED SILICA SOLS

[75] Inventor: Lawrence E. Schulz, Park Forest, Ill.

[73] Assignee: Nalco Chemical Co., Oak Brook, Ill.

[21] Appl. No.: 34,240

[22] Filed: Apr. 30, 1979

[51] Int. Cl.² ............... C03C 35/14; C03C 35/44; B01J 13/00
[52] U.S. Cl. ............... 106/65; 106/57; 106/69; 106/85; 252/313 S
[58] Field of Search ............... 106/65, 69, 57, 85; 252/313 S

[56] References Cited

U.S. PATENT DOCUMENTS

| 2,928,754 | 3/1960 | Schappel | 252/313 S |
| 2,995,453 | 8/1961 | Noble et al. | 106/85 |
| 3,179,527 | 4/1965 | Vukasovich et al. | 106/85 |
| 3,822,216 | 7/1974 | Schaefer | 252/313 S |
| 3,956,171 | 4/1976 | Moore, Jr. et al. | 252/313 S |
| 3,957,520 | 5/1976 | Linton | 106/85 |
| 4,046,581 | 9/1977 | Cassidy | 106/85 |

*Primary Examiner*—O. R. Vertiz
*Assistant Examiner*—Mark Bell
*Attorney, Agent, or Firm*—John G. Premo; Robert A. Miller

[57] ABSTRACT

An improved binder is based upon an aluminum phosphate gelled colloidal silica. The composition of the binder may vary within the following limits (calcined basis):

| Colloidal Silica | 60-85% |
|---|---|
| $P_2O_5$ | 5-35% |
| $Al_2O_3$ | 5-15%. |

2 Claims, No Drawings

THIXOTROPIC REFRACTORY BINDER BASED UPON ALUMINUM PHOSPHATE GELLED SILICA SOLS

INTRODUCTION

A highly thixotropic binder has been developed for refractory compositions. The binder is especially suited to vibration casting of monolithic shapes, but it may also be used for gunning, trowelling, ramming or manufacture of preformed shapes. The main advantages of the binder are the high strengths and good resistance to chemical attack which it imparts to the material.

THE INVENTION

An improved refractory binder comprising:

| Ingredients | % by Weight |
|---|---|
| Aqueous colloidal silica sol having an average particle size greater than 35 millimicrons and a silica concentration ($SiO_2$) of at least 40% by weight | 60–85 |
| Phosphoric acid expressed as $P_2O_5$ | 5–35 |
| $Al_2O_3$ (Alumina) | 5–15 |

The Aqueous Colloidal Silica Sols

As indicated, the invention utilizes aqueous colloidal silica sols which have an average particle size of at least 35 millimicrons with a preferred particle size range being within the range of 50–70 millimicrons. The silica concentration of the sol expressed as $SiO_2$ should be at least 40% and, preferably, about 50% by weight. While the pH is not believed to be critical, it is preferred that the sols be alkaline, e.g. have a pH greater than 8. A typical silica sol useful in the practice of the invention is sold by Nalco Chemical Company under the name, NALCOAG® 1060, and has the following general description:

| | |
|---|---|
| Colloidal Silica as $SiO_2$ | 50% |
| pH | 8.5 |
| Average Particle Size | 50–70 m$\mu$ |
| Average Surface Area | 40–60 $M^2$/gram |
| Specific Gravity at 68° F. | 1.390 |
| Viscosity at 77° F. | 15 cp max |

The aqueous colloidal silica sols are well known materials and are further described in the textbook, *The Colloidal Chemistry of Silica and Silicates*, by Ralph K. Iler, Cornell University Press, 1955. The disclosure of this treatise is incorporated herein by reference.

The Phosphoric Acid

As indicated, the amount of phosphoric acid used to prepare the binders of the invention should be an amount to provide a $P_2O_5$ content within the range of 5–35%. It is preferred to use relatively concentrated phosphoric acid solutions. Hence, I prefer to use a phosphoric acid which contains at least 70% phosphoric acid and, most preferably, 80% or more.

The Alumina

The alumina may be any hydrated alumina which is used in an amount sufficient to provide at least 5–15% by weight to the finished binder composition. The alumina is conveniently obtained from the Bayer process which dissolves bauxite or other alumina-containing ore in caustic and then precipitates the alumina. This provides an alumina hydrate of good purity and quantity. While particle size is not critical, it is convenient to use an alumina having about 30 mesh Tyler sieve size.

While it is most preferred that pure alumina be used, it is possible to substitute therefor alumina-containing materials such as high alumina clays so as not more than about 50% of the alumina substitute is used.

The binder of the invention may be considered as an aluminum phosphate gelled colloidal silica. Aluminum phosphate in its various forms and species, as well as its method of manufacture, is set forth in U.S. Pat. No. 2,460,344, the disclosure of which is incorporated herein by reference. While both colloidal silica and aluminum phosphate per se have been used as refractory binders for many years, the combination of these two materials seems to produce a binder that is quite remarkable in that it is capable of binding a wide variety of alumina-containing refractories which produce superior products.

The binders of the invention can be prepared conveniently by adding the alumina and the phosphoric acid directly to the colloidal silica sol using good agitation and a slow rate of addition. Also, the alumina can be added to the phosphoric acid or by other suitable means combined therewith to pre-prepare an aluminum phosphate which then would be added to the silica sol to form the compositions of the invention.

The finished compositions of the invention range in physical properties from rubbery-like gels to thick viscous liquids resembling maple syrup on a cold day with respect to their viscosity characteristics. In all cases the preferred binders of the invention can be converted to flowable, easily handled liquids by the application of shear in the form of high speed stirring and the like. When the phosphoric acid, alumina and colloidal silica are mixed, the product may gel in periods of time ranging between several hours to several months. In other instances the product will not gel but merely will thicken. In using the invention as a binder for various refractories, it is also possible to mix the phosphoric acid, alumina and colloidal silica directly with the other components of the formula, allowing the compositions to pre-form in situ.

The binders of the invention are particularly useful in producing a large number of refractory products which contain large quantities of alumina, e.g. at least 40% by weight. As indicated, the binders are useful in producing monolithic shapes as binders and for gunning, troweling and ramming mixes of the type used in steel mills where refractories contact molten steel or iron.

To illustrate typical refractory products which utilize the binder compositions of the invention, typical compositions are presented below in Table I.

TABLE I

Typical compositions utilizing this binder system are listed below:

TYPICAL COMPOSITIONS

| | A | B | C | D | E | F |
|---|---|---|---|---|---|---|
| ¼" Tab Alumina | — | — | — | — | 50 | — |
| 3M Mullite | — | — | — | — | — | 48.2 |
| 6M Mullite | 57.5 | 57.5 | 20 | 62.5 | — | 16.9 |
| 14M Tab Alumina | — | — | — | — | 10 | — |
| 35M Mullite/Kyanite | 10.0 | 12.5 | — | 7.5 | 7.5 | 9.6 |
| 325M Calcined Alumina | 22.5 | 22.5 | 20 | 22.5 | 20 | 16.9 |
| Zircon | — | — | 52.5 | — | — | — |

TABLE I-continued

Typical compositions utilizing this binder system are listed below:

TYPICAL COMPOSITIONS

|  | A | B | C | D | E | F |
|---|---|---|---|---|---|---|
| Hydrated Alumina | 0.8 | 0.6 | 0.6 | 0.35 | 0.6 | 0.2 |
| Silica Sol (50% solids) | 8.4 | 6.0 | 6.0 | 6.1 | 7.5 | 4.6 |
| 85% Phosphoric Acid | 1.2 | 0.9 | 0.93 | 0.95 | 1.45 | 0.6 |
| Stainless Steel Fiber Reinforcing | — | — | — | — | — | 3.0 |

Listed below are the various uses for which the compositions of the invention would be suitable:

| Composition | Application |
|---|---|
| A | This is a ramming mix suitable for use where a 70% alumina composition is desired. Mixing with water at the time of installation would make this material suitable for vibration casting. |
| B | This mix would be mixed with water at the time of installation. It would be suitable for gunning, vibration casting, or trowelling where a 70% alumina composition was required |
| C | This mix would be suitable as a general purpose repair mix in glass melting furnaces and forehearths. It could be used as a ramming mix or wetted for trowelling and vibration casting. |
| D | This mix would be used in the same manner as "B". |
| E | This is a 90% alumina version of A. It would be suitable for ramming as shown. When mixed with water, it can be used for casting and trowelling. |
| F | This mix is mixed with water and vibration cast. It has shown very good resistance to thermal shock and mechanical abuse when used as an injection lance for desulfurization of molten iron. |

Having thus described my invention, it is claimed:

1. An improved refractory binder consisting essentially of:

| Ingredients | % by Weight |
|---|---|
| Aqueous colloidal silica sol having an average particle size greater than 35 millimicrons and a silica concentration, ($SiO_2$), of at least 40% by weight | 60–85 |
| Phosphoric acid expressed as $P_2O_5$ | 5–35 |
| $Al_2O_3$ (Alumina) | 5–15 |

2. The binder of claim 1 where the aqueous colloidal silica sol has an average particle size within the range of 50–70 m$\mu$ and a colloidal silica concentration of about 50%.

* * * * *